United States Patent
Heisig et al.

(10) Patent No.: US 8,639,697 B2
(45) Date of Patent: Jan. 28, 2014

(54) COMPUTER SYSTEM PERFORMANCE ANALYSIS

(75) Inventors: Stephen John Heisig, Watson, NY (US); Yan Qi Wang, Beijing (CN); Jing Xiao, Shanghai (CN); Yu Yuan, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/459,559

(22) Filed: Apr. 30, 2012

(65) Prior Publication Data

US 2012/0215781 A1 Aug. 23, 2012

Related U.S. Application Data

(63) Continuation of application No. 12/964,869, filed on Dec. 10, 2010, now Pat. No. 8,271,494.

(30) Foreign Application Priority Data

Jan. 11, 2010 (CN) .......................... 2010 1 0002096

(51) Int. Cl.
*G06F 7/00* (2006.01)
*G06F 17/30* (2006.01)

(52) U.S. Cl.
USPC ........................................... 707/737; 700/32

(58) Field of Classification Search
None
See application file for complete search history.

(56) References Cited

U.S. PATENT DOCUMENTS

| | | | | |
|---|---|---|---|---|
| 5,483,468 A | * | 1/1996 | Chen et al. | 702/186 |
| 5,530,942 A | * | 6/1996 | Tzou et al. | 715/202 |
| 5,774,724 A | | 6/1998 | Heisch | |
| 5,937,191 A | * | 8/1999 | Graham | 717/130 |
| 5,963,740 A | | 10/1999 | Srivastava et al. | |
| 6,009,079 A | * | 12/1999 | Boye et al. | 370/242 |
| 6,035,306 A | * | 3/2000 | Lowenthal et al. | 1/1 |
| 6,044,335 A | * | 3/2000 | Ksendzov | 702/182 |
| 7,433,803 B2 | | 10/2008 | Circello et al. | |
| 7,574,587 B2 | | 8/2009 | DeWitt, Jr. et al. | |
| 7,590,508 B1 | * | 9/2009 | Saghier et al. | 702/182 |
| 2002/0156884 A1 | * | 10/2002 | Bertram et al. | 709/224 |
| 2003/0014741 A1 | * | 1/2003 | Megiddo et al. | 717/158 |
| 2003/0142803 A1 | * | 7/2003 | Freedman et al. | 379/114.14 |

(Continued)

FOREIGN PATENT DOCUMENTS

| | | |
|---|---|---|
| CN | 1604035 A | 4/2005 |
| CN | 101506804 A | 8/2009 |
| EP | 0689141 | * 12/1995 |
| WO | 2007104612 A1 | 9/2007 |

OTHER PUBLICATIONS

System-Level Performance Phase Characterization for ON-Demand resource Provisioning, Zhang et al, pp. 434-439, IEEE 2007.*

(Continued)

*Primary Examiner* — Augustine K Obisesan
(74) *Attorney, Agent, or Firm* — Garg Law Firm, PLLC; Rakesh Garg; Eustus D Nelson (57) ABSTRACT

This invention relates to a method and device for computer system performance analysis. All instructions are split into clusters based on significant offset gaps in top-down processing steps. Comments on instruction clusters can be generated automatically or can be edited manually. The comments can be shared among users for the achievement of portability. Significant clusters can be recognized as hotspots based on predetermined metrics.

15 Claims, 11 Drawing Sheets

(56) References Cited

U.S. PATENT DOCUMENTS

| | | | |
|---|---|---|---|
| 2004/0111708 A1* | 6/2004 | Calder et al. | 717/131 |
| 2005/0038631 A1* | 2/2005 | Steinke | 702/182 |
| 2005/0078805 A1* | 4/2005 | Mills et al. | 379/67.1 |
| 2006/0053421 A1* | 3/2006 | Dickenson | 718/100 |
| 2006/0101421 A1* | 5/2006 | Bodden et al. | 717/130 |
| 2006/0218450 A1* | 9/2006 | Malik et al. | 714/47 |
| 2006/0265192 A1* | 11/2006 | Turicchi | 702/187 |
| 2007/0022142 A1* | 1/2007 | Palmer et al. | 707/200 |
| 2007/0067425 A1* | 3/2007 | McKinney | 709/223 |
| 2007/0143722 A1* | 6/2007 | Venkateswaran et al. | 716/6 |
| 2007/0143743 A1* | 6/2007 | Cobb et al. | 717/127 |
| 2007/0185990 A1* | 8/2007 | Ono et al. | 709/224 |
| 2008/0244533 A1 | 10/2008 | Berg et al. | |
| 2009/0100440 A1* | 4/2009 | Glaser et al. | 719/318 |
| 2009/0177642 A1 | 7/2009 | Chung et al. | |
| 2009/0307671 A1* | 12/2009 | White et al. | 717/149 |
| 2009/0312983 A1* | 12/2009 | Lee et al. | 702/180 |

OTHER PUBLICATIONS

Performance Study for a Microcell Hos Spot Embedded in CDMA Macrocell Systems, Wu et al., pp. 47-59, IEEE1999.*

Performance Analysis of Median Filtering on Meiko—A Distributed Multiprocessor System, pp. 631-639, Poon et al.*

System Noise, OS CLock Ticks, and Fine-Grained Parallel Applications, Tsafrir et al, pp. 303-312, ICS'05 Jun. 20-22, 2005.*

Performance Metrics and Ontology for Describing Performance Data fo Grid Workflows, Hong-Linh et al, IEEE International Symposium on Cluster Computing and the Grid, pp. 301-308, 2005.*

* cited by examiner

| sid | module | symbol | clusterN | startOffset | endOffset | centeroid | span | iDensity | ticks | tPercentItDensity | ICDirMs_t | tICDirMs_c | DCDirMs_t | tDCDirMs_c |
|---|---|---|---|---|---|---|---|---|---|---|---|---|---|---|
| 12 | DSN1DM | DSNB1OFA | 13 | b94 | c82 | bd9 |  | 241 | 0.17 | 47738 | 6.800072 | 198.08 | 6557 | 27.21 | 21461 | 89.05 |
| 141 | DSN1DM | NoSymbol | 2 |  | 558 | 558 | 558 | 3 | 0.33 | 503 | 0.07165 | 167.67 | 135 | 45 | 4 | 1.33 |
| 141 | DSN1DM | NoSymbol | 0 | a0 |  | 108b6 |  | 107 | 0.16 | 8776 | 1.250103 | 82.02 | 324 | 3.03 | 736 | 6.88 |
| 71 | DSN1DM | DSNOFRLC | 6 | 5ce | 604 | 5dd |  | 57 | 0.18 | 3783 | 0.538872 | 66.37 | 54 | 0.95 | 3441 | 60.37 |
| 66 | DSN1DM | DSN1CUBD | 16 | daa | eae | e71 |  | 263 | 0.17 | 17342 | 2.470293 | 65.94 | 637 | 2.42 | 13312 | 50.62 |
| 65 | DSN1DM | DSNB1REL | 1 | 2.00E+00 | 328 | 309 |  | 75 | 0.17 | 4938 | 0.703397 | 65.84 | 120 | 1.6 | 3995 | 53.27 |
| 226 | DSN1DM | DSNB1PCP | 10 | 3104 | 3104 | 3104 |  | 3 | 0.33 | 189 | 0.026922 | 63 | 47 | 15.67 | 0 | 0 |
| 98 | DSN1DM | DSNB1CMS | 1 | 66e | 73c | 6ed |  | 209 | 0.11 | 11702 | 1.666899 | 55.99 | 213 | 1.02 | 10036 | 48.02 |
| 99 | DSN1DM | DSNB1CMU | 14 | bc4 | bd8 | bc4 |  | 23 | 0.26 | 1176 | 0.167516 | 51.13 | 11 | 0.48 | 1100 | 47.83 |
| 89 | DSN1DM | DSN1CUBC | 1 | c74 | c74 | c74 |  | 3 | 0.33 | 129 | 0.018375 | 43 | 52 | 17.33 | 27 | 9 |
| 71 | DSN1DM | DSNOFRLC | 14 | 108a | 108a | 108a |  | 3 | 0.33 | 117 | 0.016666 | 39 | 2 | 0.67 | 3 | 1 |
| 20 | DSN1DM | DSNB1GFP | 12 | 1000 | 102e | 1018 |  | 49 | 0.2 | 1901 | 0.270789 | 38.8 | 161 | 3.29 | 1740 | 35.51 |
| 29 | DSN1DM | DSNB1BNRF | 9 | 714 | 714 | 714 |  | 3 | 0.33 | 106 | 0.015099 | 35.33 | 17 | 5.67 | 39 | 13 |
| 20 | DSN1DM | DSNB1GFP | 1 | 344 | 35c | 351 |  | 27 | 0.22 | 796 | 0.113387 | 29.48 | 184 | 6.81 | 493 | 18.26 |
| 66 | DSN1DM | DSN1CUBD | 18 | 10ca | 110e | 10fa |  | 71 | 0.21 | 2091 | 0.297854 | 29.45 | 101 | 1.42 | 1956 | 27.55 |
| 29 | DSN1DM | DSNB1BNRF | 8 | 4d2 | 4d2 | 4d2 |  | 3 | 0.33 | 82 | 0.011681 | 27.33 | 8 | 2.67 | 18 | 6 |
| 65 | DSN1DM | DSNB1REL | 3 | 39a | 3.00E+00 | 3d8 |  | 73 | 0.16 | 1957 | 0.278766 | 26.81 | 43 | 0.59 | 1681 | 23.03 |
| 29 | DSN1DM | DSNB1BNRF | 6 |  | 450 | 450 | 450 | 3 | 0.33 | 71 | 0.010114 | 23.67 | 22 | 7.33 | 16 | 5.33 |
| 65 | DSN1DM | DSNB1REL | 20 | 1d54 | 1.00E+32 | 1ddf |  | 225 | 0.15 | 5233 | 0.745418 | 23.26 | 214 | 0.95 | 4159 | 18.48 |
| 71 | DSN1DM | DSNOFRLC | 7 | 698 | 6d6 | 6a0 |  | 65 | 0.2 | 1510 | 0.215093 | 23.23 | 32 | 0.49 | 1308 | 20.12 |
| 74 | DSN1DM | DSNKINSL | 4 | c102 | c102 | c102 |  | 3 | 0.33 | 65 | 0.009259 | 21.67 | 55 | 18.33 | 0 | 0 |
| 71 | DSN1DM | DSNOFRLC | 12 | a4a | a50 | a4a |  | 9 | 0.22 | 193 | 0.027492 | 21.44 | 5 | 0.56 | 149 | 16.56 |
| 65 | DSN1DM | DSNB1REL | 18 | 1c16 | 1c50 | 1c1d |  | 61 | 0.18 | 1283 | 0.182758 | 21.03 | 12 | 0.2 | 1015 | 16.64 |
| 20 | DSN1DM | DSNB1GFP | 9 | bb4 | bb4 | bb4 |  | 3 | 0.33 | 62 | 0.008832 | 20.67 | 29 | 9.67 | 1 | 0.33 |
| 20 | DSN1DM | DSNB1GFP | 3 | 73c | 78a | 748 |  | 81 | 0.21 | 1621 | 0.230904 | 20.01 | 34 | 0.42 | 1198 | 14.79 |
| 29 | DSN1DM | DSNB1BNRF | 12 | 9.00E+00 | 9.00E+00 | 9.00E+00 |  | 3 | 0.33 | 58 | 0.008262 | 19.33 | 18 | 6 | 23 | 7.67 |
| 56 | DSN1DM | DSNB1DCM | 8 |  | 604 | 670 | 621 | 111 | 0.17 | 2129 | 0.303267 | 19.18 | 119 | 1.07 | 1656 | 14.92 |
| 26 | DSN1DM | DSNIKESE | 8 | 15ba |  | 15c2 | 15bb | 11 | 0.27 | 207 | 0.029486 | 18.82 | 78 | 7.09 | 14 | 1.27 |
| 20 | DSN1DM | DSNB1GFP | 6 | 8b6 |  | 948 | 8.00E+09 | 149 | 0.17 | 2803 | 0.399275 | 18.81 | 357 | 2.4 | 2045 | 13.72 |
| 65 | DSN1DM | DSNB1REL | 5 |  | 540 | 5f0 | 55f | 179 | 0.15 | 3314 | 0.472065 | 18.51 | 241 | 1.35 | 2423 | 13.54 |
| 26 | DSN1DM | DSNIKESE | 6 | 11ec |  | 1258 | 121c | 111 | 0.19 | 2041 | 0.290732 | 18.39 | 195 | 1.76 | 707 | 6.37 |
| 66 | DSN1DM | DSN1CUBD | 5 |  | 534 | 650 | 5c9 | 287 | 0.16 | 5232 | 0.745276 | 18.23 | 155 | 0.54 | 4472 | 15.58 |
| 26 | DSN1DM | DSNIKESE | 4 | 3c2 |  | 414 | 3dc | 85 | 0.16 | 1506 | 0.214523 | 17.72 | 80 | 0.94 | 976 | 11.48 |
| 71 | DSN1DM | DSNOFRLC | 4 | 4fa |  | 4fe | 4fb | 7 | 0.29 | 121 | 0.017236 | 17.29 | 4 | 0.57 | 4 | 0.57 |

COMPUTER SYSTEM PERFORMANCE ANALYSIS

The present application is a continuation of patent application Ser. No. 12/964,869, which is co-pending with the present application.

TECHNICAL FIELD

The present invention relates to computer system performance analysis, and more specifically, to a method, program product, and device for performing computer system performance analysis.

DESCRIPTION OF THE RELATED ART

It is valuable for system designers, software developers, users or data center operators to analyze and then improve performance deficiencies of their systems (e.g., hardware, software and services) from sampled data of hardware with low cost.

There are many system performance analysis tools, such as Oprofile, Intel Vtune, IBM VPA, and the like. (Intel and Vtune are trademarks of Intel Corporation in the United States, other countries, or both. IBM is a registered trademark of international Business Machines Corporation in the United States and other countries). Such tools may provide visual system performance analysis results through tables and graphics based on sample data supplied by, e.g., performance counters.

As is well known in this art, in general, system operation status can be monitored by a hardware performance counter during system operation, and related events can be recorded into a system log file. Commonly, up to hundreds of events can be monitored and recorded, including ticks, instruction cache miss (i-cache miss), data cache miss (d-cache miss), branch miss, etc. Those events can be counted continuously by the performance counter. For example, it is conceivable to monitor a system by a performance counter at an interval of 1 millisecond (ms) to find out what instructions are running and record the addresses of those instructions. Once an instruction is monitored as running, tick count of this instruction is increased by 1. The above monitoring can be repeated during a predetermined period of time, such as one hour, and the counts of the event that the identical instruction is running can be summed up to get sum of the ticks. Similarly, other events can be counted and the corresponding addresses can be recorded. Based upon the records about the above events in system log files, a system performance analysis tool can form a sorted list. System performance deficiencies or bottlenecks can be found out through further analyzing such a sorted list. For instance, hotspots, i.e., instructions executed at a relatively high frequency, corresponding functions, modules, etc, can be identified through ordering instruction ticks within the sorted list. Therefore, the corresponding hotspot areas can be adjusted to optimize system performance.

As mentioned above, however, those existing performance analysis tools only can provide sorted lists of instruction, function or module based performance statistics, rather than instruction block (instruction cluster) based statistics. Hence, merely hotspots with fixed granularity, such as instruction, function or module based hotspots can be provided.

SUMMARY

In view of the above problems in the prior art, one object of this invention is to provide a new method and device for system performance analysis which can at least partly resolve the above problems in the prior art. Further, another object of this invention is to provide portable comments for system performance analysis results.

To achieve the above objects, according to one aspect of this invention, a method for computer system performance analysis is provided, comprising the steps of: receiving a computer system performance log file; clustering instructions involved in the computer system performance log file at flexible granularity to acquire code clusters; and outputting the result of computer system performance analysis based on the code clusters.

According to another aspect of this invention, a device for computer system performance analysis is provided, comprising: a performance log file receiver for receiving a computer system performance log file; a clustering handler for clustering instructions involved in the computer system performance log file at flexible granularity to acquire code clusters; and a performance viewer for outputting the result of computer system performance analysis based on the code clusters.

This invention can provide a method and device for generating a sorted list of performance statistics based on associated instruction blocks (instruction clusters), it is also possible to provide the above method and device with a mechanism to attach portable meaning comments to the instruction clusters.

Wherein, all instructions can be split into clusters based on significant offset gaps in top-down processing steps. Median filtering can be used to remove noises in data.

Comments on instruction clusters can be generated automatically or can be edited manually. The comments can be shared among users to achieve portability. Significant clusters such as hotspots can be identified according to predetermined metrics, such as tick percentage, density, etc.

As compared with the prior art, this invention can identify hotspots more intelligently, improving the recognition rate and accuracy of hotspot identification.

Those and other aspects and embodiments can be known and understood better when considering in combination with following descriptions and drawings.

BRIEF DESCRIPTION OF THE SEVERAL VIEWS OF THE DRAWINGS

FIGS. 9 and 10 are schematic views of examples of identifying hotspots from performance analysis results according to the embodiments.

DETAILED DESCRIPTION

The invention recognizes that, for many application programs that comprise functions, hotspots may not be at an instruction, function or module level, but at instruction blocks (instruction clusters) that are, for example, larger than one instruction and smaller than a function/module. Furthermore, besides hotspots, there may be code areas with large instruction blocks that are intensively executed even though each instruction may only consume a few of cycles. Such code areas may not comprise any hotspot, but cover a significant large address span and have performance improvement potential as well. Herein, these areas are also referred as to large warm areas. Although large warm areas may have room for optimization, they are prone to be omitted by existing instruction-sorting performance analysis tools, and can not be identified within the sorted list of instruction, function or module based performance statistics provided by those tools.

The invention further recognizes that besides hotspots and large warm areas, there may be some code-reordering potential areas that have a significant amount of i-cache miss but an address span confined within one cache line. Those code-reordering potential areas can not be identified by existing analysis tools. Thus, the existing tools have many limitations in practice, and fail to recognize hotspots accurately and incapable of identifying large warm areas or code-reordering potential areas.

The embodiments of this invention will be illustrated below with reference to the drawings.

Figure 1:
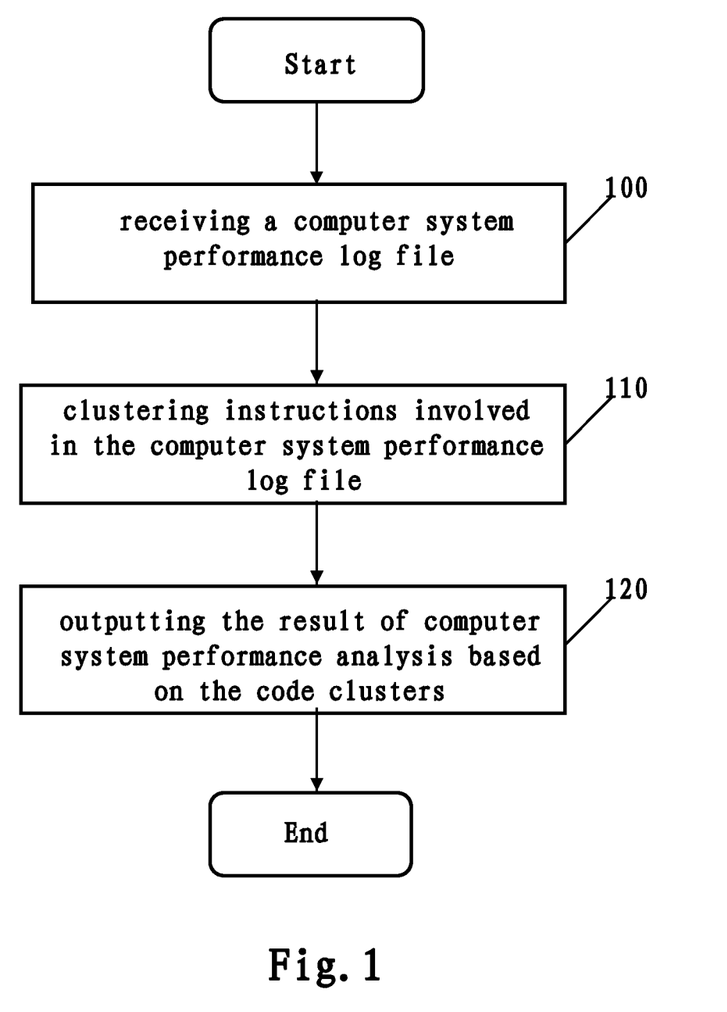
FIG. 1 is a schematic flowchart showing a method of computer system performance analysis according to a first embodiment.

FIG. 1 is a schematic flowchart showing the method of computer system performance analysis according to a first embodiment.

At step 100, a computer system performance log file is received, which is generated during a computer system execution. For example, a hardware performance counter (not shown) may monitor events such as ticks, instruction cache miss (i-cache miss), data cache miss (d-cache miss), branch miss and the like that occur during system execution, and a performance log file generator (not shown) may translate related signals into a computer system performance log file.

At step 110, a clustering process with flexible granularity is applied on the instructions involved in the computer system performance log file to acquire code clusters. The code clusters may comprise executed codes that are consecutively sampled by the hardware performance counter. That is, the sampled execution codes within a code cluster have successive numbers. Those code clusters have flexible granularity. Herein, "flexible granularity" means that the generated clusters are determined according to practical system execution status in a flexible manner, instead of being generated on a traditional fixed level, such as on the level of instruction, function or module. In other words, in the present embodiment, clusters may be of a level larger than one instruction but smaller than one function or module. In some cases, the generated cluster may also be an instruction, function or module. This, however, is determined according to practical status and is not predefined. Two dimensions (2D) clustering can be applied, i.e. clustering on the dimensions of ticks and instruction address offset.

At step 120, a computer system performance analysis result based on the code clusters generated in step 110 is outputted. For example, the computer system performance analysis result may be provided to users for viewing and using in a visual manner, such as in a list or graphic. The items within the list of the system performance analysis result may comprise cluster number (ClusterNo), module, symbol, startoffset, endoffset, span, center of cluster (centriod), ticks, tperent, tDensity, ICDMirMs_total, DCDMirMs_total, ICDMirMs_density, DCDMirMs_density, etc. Herein, ticks are the execution times of a respective code cluster counted by the hardware counter, tperent is the rate of the ticks of the respective code cluster to sum of the ticks, tDensity is the rate of the ticks to the instruction address span of the respective code cluster, and similarly, ICDMirMs_density is the rate of ICDMirMs_total (the total number of instruction cache miss) to the instruction address span, DCDMirMs_density is the rate of DCDMirMs_total (the total number of data cache miss) to the instruction address span, and centriod is the rate of the sum of production of the ticks and the address offsets of a respective cluster to the sum of the ticks.

Figure 2:
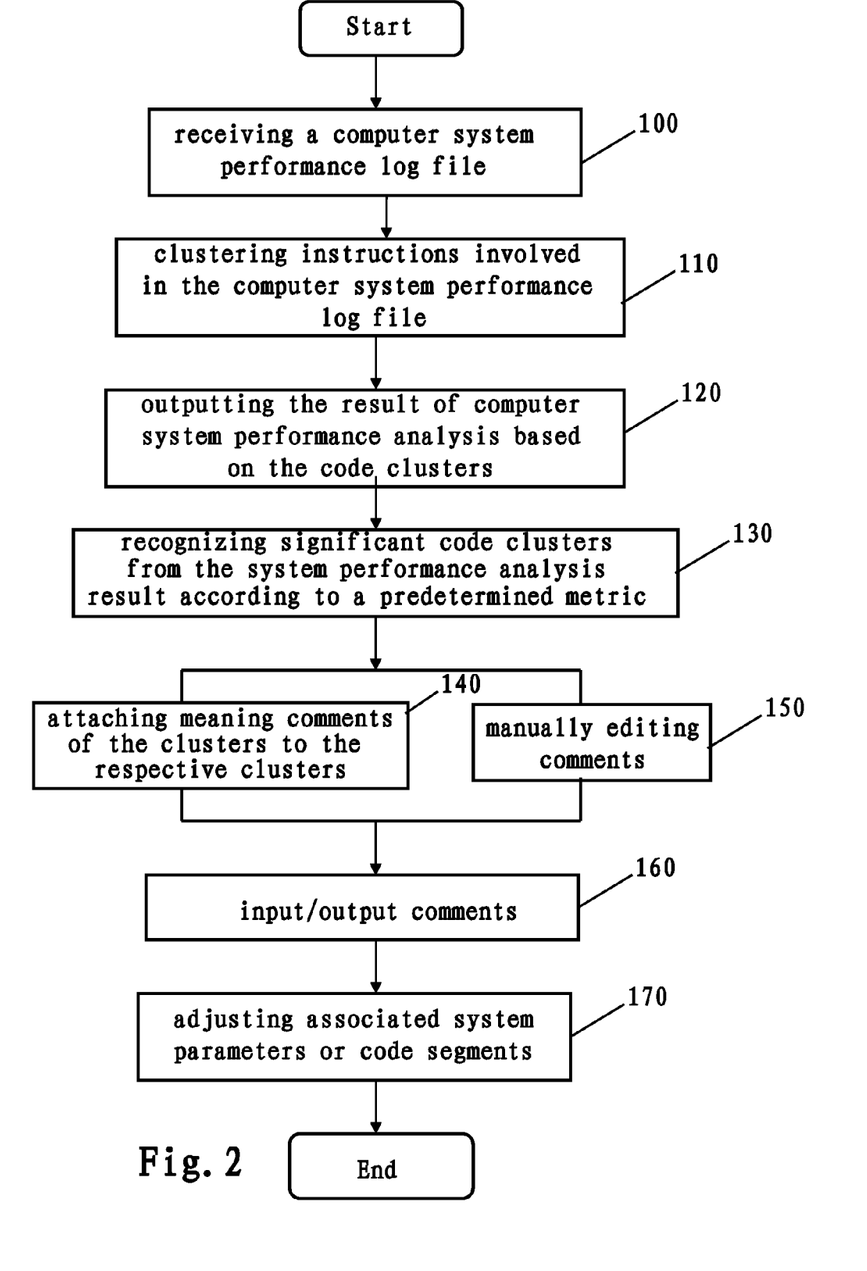
FIG. 2 is a schematic flowchart showing a method of computer system performance analysis according to a second embodiment.

FIG. 2 is a schematic flowchart showing the method of computer system performance analysis according to a second embodiment. In this embodiment, the same reference signs are used to refer to the same steps as those of FIG. 1, the detailed description of which are omitted herein.

The method of computer system performance analysis according to the present embodiment differs from the first embodiment in that it is possible to further recognize significant code clusters, such as hotspots, large warm areas, code-reordering potential areas and the like, from the system performance analysis result. Hereinafter, examples of recognizing hotspots, large warm areas, code-reordering potential areas will be described below in detail.

In the method of this embodiment, after the implementation of the same steps as steps 100-120 of the first embodiment, at step 130, significant code clusters are recognized from the system performance analysis result according to a predetermined metric. For example, the predetermined metric may be tick percentage or tick density, and the significant code clusters may be hotspots. Tick percentage is the rate of ticks of the respective code cluster to sum of the ticks, and the ticks are the executing times of the respective code cluster counted by a hardware counter. Tick density is the rate of the ticks to the instruction address range of the respective code cluster.

For example, through tick percentage sorting, a code cluster with higher tick percentage can be recognized as a significant code cluster, i.e. the hotspot. Alternatively, as another example, through address span sorting, a larger warm area that comprises no hotspot but cover a significant large address span (larger than a predetermined threshold) can be recognized as a significant code clusters, i.e. a large warm area. Alternatively, as another example, through ICDMirMs_total or ICDMirMs_density sorting, a code cluster with ICDMirMs_total or ICDMirMs_density significantly larger than a predetermined threshold and with an address span smaller than one cache line can be recognized as a significant code cluster, i.e. a code-reordering potential area.

Optionally, the method of computer system performance analysis according to the present embodiment may further comprise a process of attaching meaningful comments about the code clusters to those clusters.

For example, at step 140, meaningful comments about those clusters are attached to the clusters. For example, the code clusters can be matched (compared) with the previous system performance analysis result to get corresponding code descriptions, which can be used as the comments for the corresponding code clusters. The code descriptions are descriptions representing that the corresponding clusters are hotspots, large warm areas or code-reordering potential areas, or other descriptions that are associated with items within the system performance analysis result. Alternatively, distances between each code cluster and its adjacent clusters can also be calculated and attached as the comments.

At step 150, the comments can be edited manually, for example, users can enter comment(s) about certain instruction cluster(s) to specify the cluster's function, the procedure to which the cluster belongs, and the like. Step 150 and step 140 can be implemented in parallel. Manually editing operation can be implemented in the case where no comment is matched with a corresponding code cluster in the previous system performance analysis result, or in the case where modifications of the matched comments are expected.

At step 160, the generated comments can be outputted. For example, the comments generated in steps 140 and 150 can be outputted in a comment file. When running other workloads by other users, comments of corresponding instruction clusters can be entered, such as through fuzzy matching, achieving comment portability. As an illustrative example, centeroid (cluster center) can be used as a parameter of fuzzy matching, wherein centeroid can be calculated by:

$$\text{Centeroid} = \text{sum}(\text{ticks} * \text{offset}) / \text{sum}(\text{ticks}) \quad (1)$$

Where Centeroid, ticks, and offset indicate the center of a cluster, number of ticks, and address offset respectively.

That is, Centeroid is the ratio of the sum of the products of the ticks and the address offset of a respective cluster, to the sum of the ticks. Since Centeroid is substantially constant for different workloads, the same Centeroid may indicate a matched address span with a corresponding cluster, and thus a same comment can be used in different workloads.

At step 170, the recognized hotspots can be related to the corresponding code segments according to the sorted list of the system performance analysis result. Further, system parameters of the associated code segments can be adjusted to optimize system performance.

Hereinafter, the 2D clustering process of the above embodiments will be further described.

Figure 3:
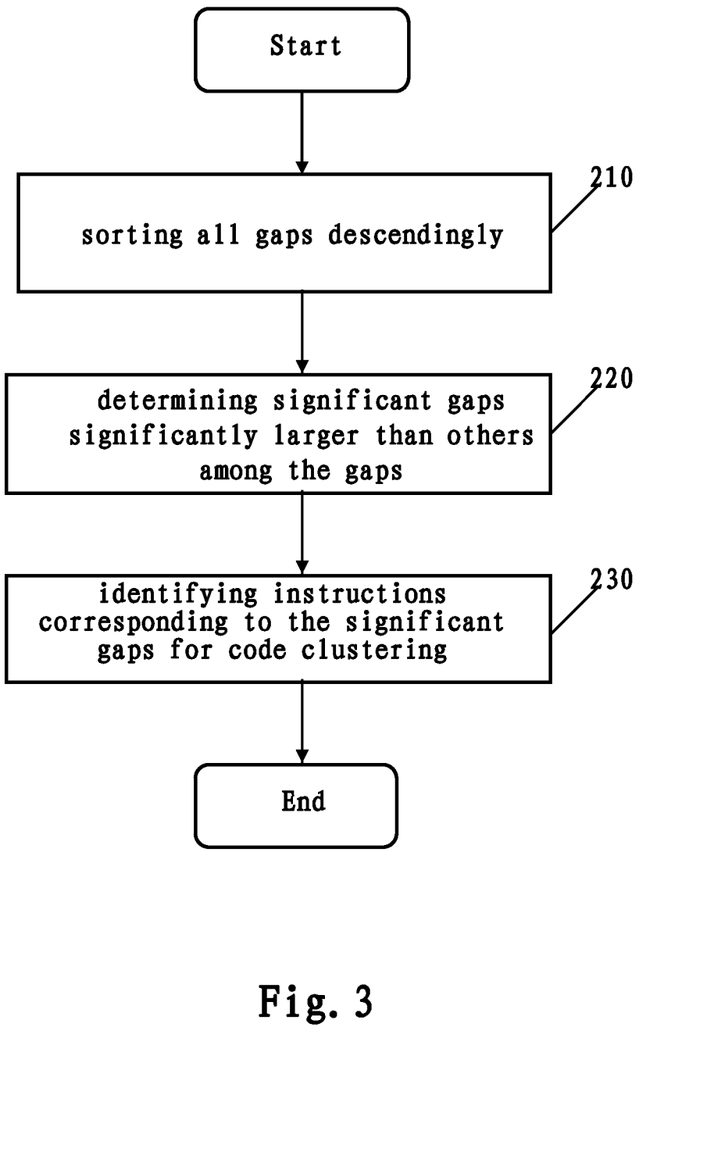
FIG. 3 is a schematic flowchart showing a clustering process according to the embodiments.

FIG. 3 is a schematic flowchart showing the clustering process according to the embodiments.

At step 210, all gaps are sorted in a descending order, wherein a gap is the difference between the address of a current instruction and the address of a next instruction, the largest gap having a smallest number as its value, the numbers of other gaps increasing in order. Gap is one of the most effective signals that can be used to identify logically related instructions.

At step 220, significant gaps, i.e. gaps significantly larger than others, are determined. Instructions separated by those significant gaps can be placed into different clusters.

Figure 4:
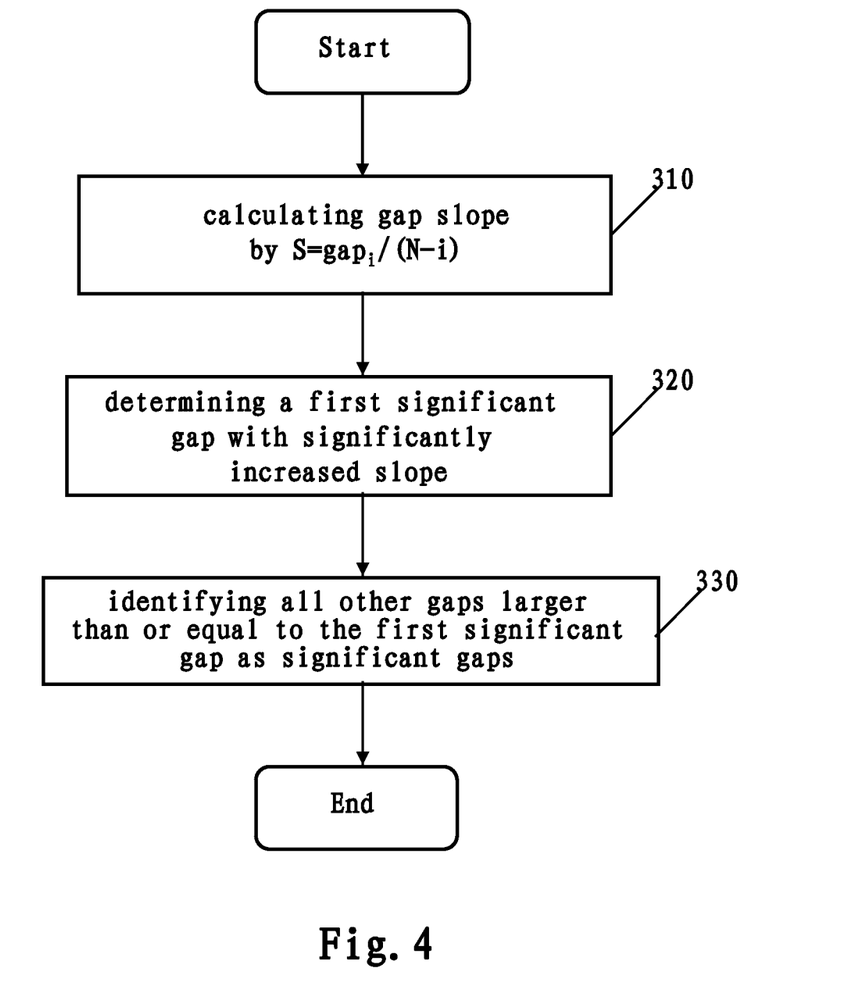
FIG. 4 is a schematic flowchart showing an example of the significant gap determination of the clustering process shown in FIG. 3.

FIG. 4 is a schematic flowchart showing the example of the significant gap determination.

For example, at step 310, the slope of each gap is calculated as:

$$S = \text{gap}_i / (N - i) \quad (2)$$

Where, S is the slope, $\text{gap}_i$ is current gap value, i is the current gap number, and N is the total number of the gaps.

At step 320, a first significant gap with significantly increased slope is determined. The gap with a slope the rate of which to the slope of the next gap is larger than a significant gap threshold is determined, and is identified as the first significant gap. The significant gap threshold can be selected to get a reasonable clustering result, i.e., avoiding either placing instructions having relatively larger address distances into a single cluster due to too coarse a division granularity, or becoming into a traditional instruction-level scenario due to too fine a granularity.

At step 330, all other gaps larger than or equal to the first significant gap are identified as significant gaps.

Figure 6:
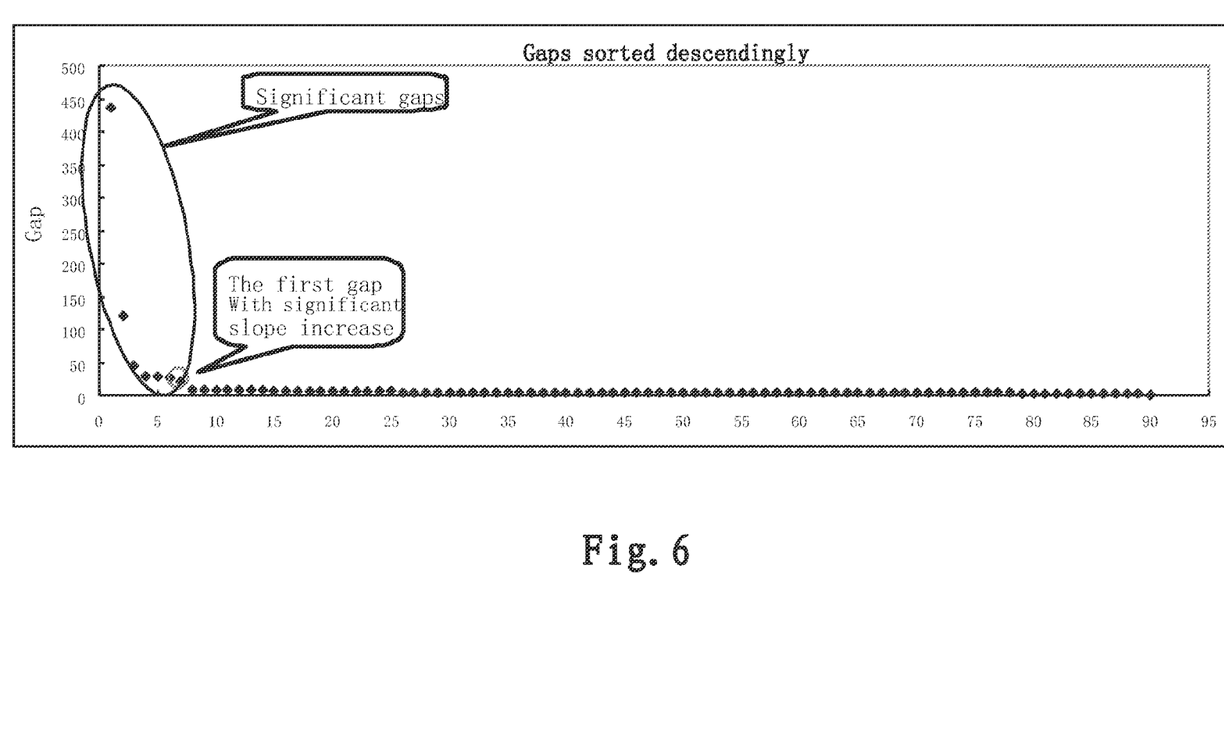
FIG. 6 is a schematic flowchart showing an example of significant gap determination of the clustering process according to the embodiments.

FIG. 6 shows an example of determining the significant gaps. As shown in the figure, the gaps are sorted in a descending order, wherein the largest gap has a number of 0 and the numbers of the other gaps increase in order. The slopes of the gaps are determined by the above equation 1. The significant gap threshold is set to 1.5 and the first gap with a significant slope increase is thus determined. All other gaps larger than the first significant gap are determined as significant gaps.

Returning to FIG. 3, at step 230, instructions corresponding to the significant gaps are identified for code clustering. That is, taking the instructions corresponding to the significant gaps as boundaries, instructions involved in the computer system performance log file are split into corresponding code clusters. Thus the instructions are split into several clusters based on the determined significant gaps.

Furthermore, a step (not shown) also can be included for automatically tuning the significant gap threshold based on user usage in a manner of standard machine learning. For example, all thresholds selected by users can be memorized, and each time the threshold that has been accepted for the most times recently can be voted as the selected threshold. Therefore, the significant gap threshold can be selected in a flexible manner for the compliance of specific requirements.

In some cases, there are some code clusters having relative larger address spans (herein, span generally refers to the difference between the end address of the start address of a corresponding code cluster) and larger tick-variances, which are acquired according to the clustering process of an embodiment. Larger tick-variance indicates larger tick fluctuation within those corresponding code clusters, i.e., the greater dispersion of the ticks; therefore, it is necessary and possible to refine the split of these clusters.

According to an improved variance of an embodiment, after acquiring the clusters according to the clustering process of an embodiment, those clusters meeting a tick-variance threshold and a span threshold can be median-filtered or binarized to refine those clusters effectively.

Alternatively, all clusters that are acquired according to the clustering process of an embodiment can be median-filtered or binarized, so that those clusters with larger address spans and larger tick-variances are further split while other clusters remain untouched. That is, those clusters suitable for binarization (two values available after binarization) will be further split and other clusters unsuitable for binarization (only one value available after binarization) will remain intact.

Figure 5:
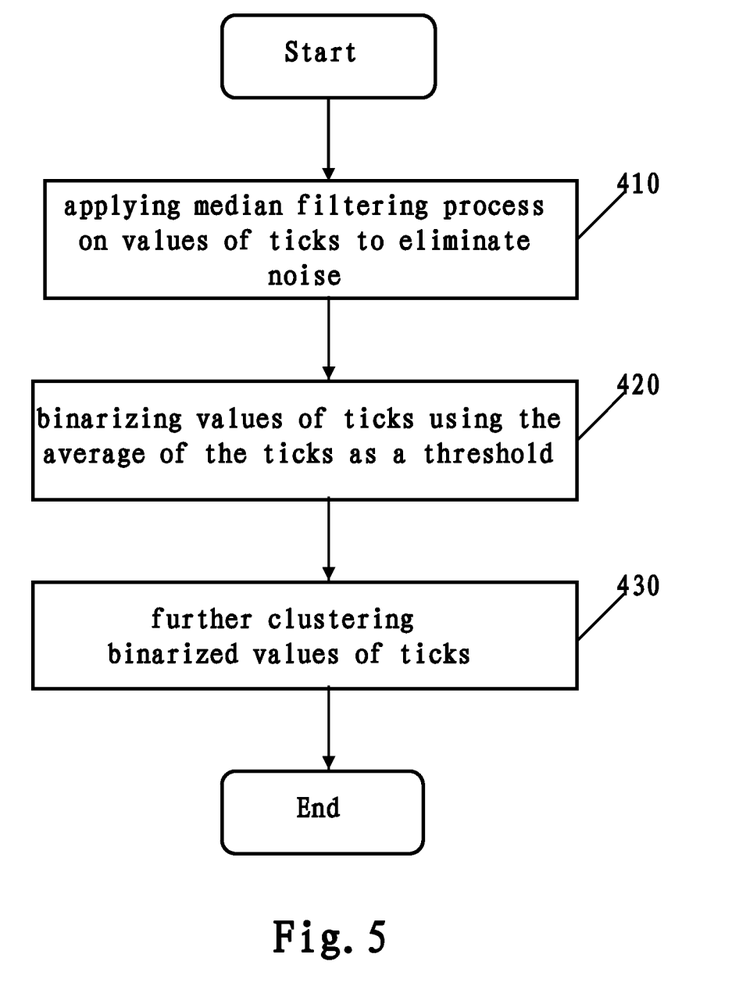
FIG. 5 is a schematic flowchart showing median filtering and binarization processes according to a variance of the second embodiment.

FIG. 5 is a schematic flowchart showing the median filtering and binarizaion processes according to this variance.

At step 410, a median filtering process is applied on tick data for noise elimination. Median filtering takes the median of total 2k+1 points: the current point, the preceding k points and the following k points, as the substitution of the current value to obtain a smoother curve.

At step 420, values of ticks are binarized using the average of the ticks as a threshold, namely, values of ticks larger than the threshold are set to 1 and those smaller than the threshold are set to 0.

At step 430, a further clustering is implemented with the binarized values of ticks.

Figure 7:
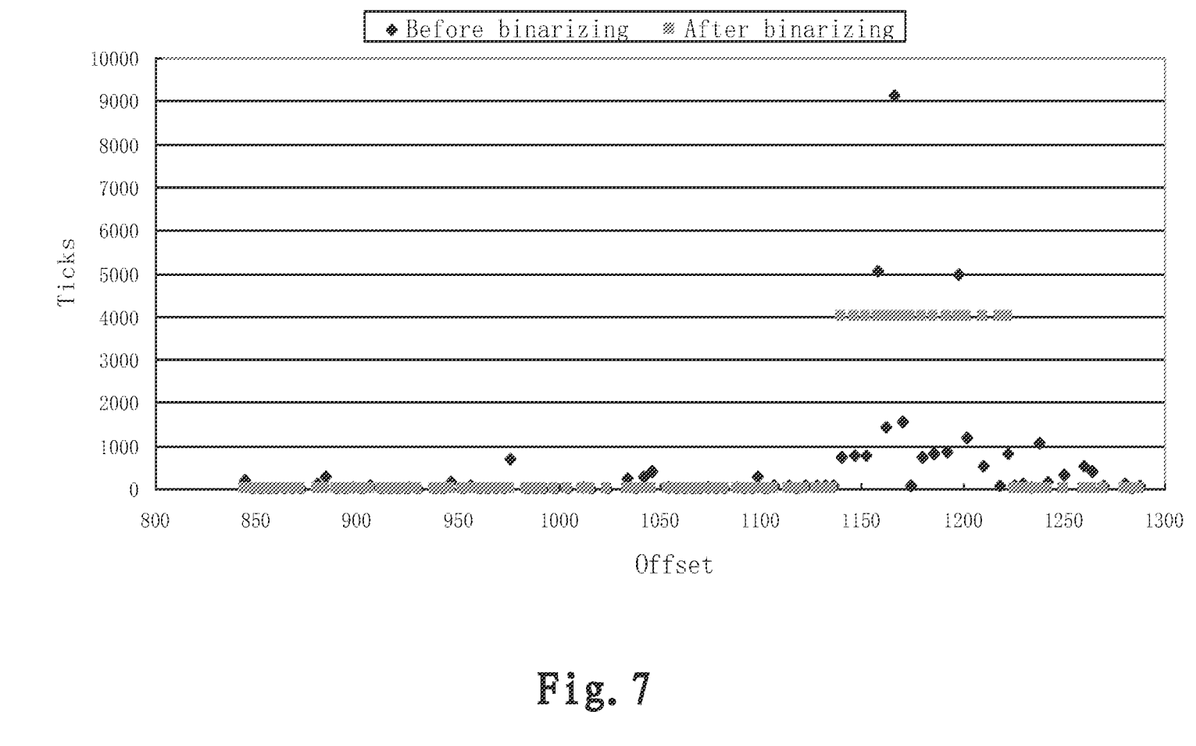
FIG. 7 is a schematic view of the example result of the median filtering process of FIG. 5.

FIG. 7 is a schematic view of the example result of the median filtering process of FIG. 5.

As shown in FIG. 7, for example, there are three clusters in the range from 844 (startoffset) to 1288 (endoffset), which corresponds to address spans: 844-1140, 1140-1226 and 1226-1288, respectively.

It will be understood, in the methods of the above-mentioned embodiments, the steps and the order of those steps are for the convenience of description and not for limitations. Those skilled in the art may appreciate that those steps can be combined or subdivided, or the order of those step can be rearranged as necessary. For example, the step of outputting system performance analysis result can be implemented before or after the step of recognizing significant clusters, or can be implemented after the step of outputting comments, and the like.

Figure 8:
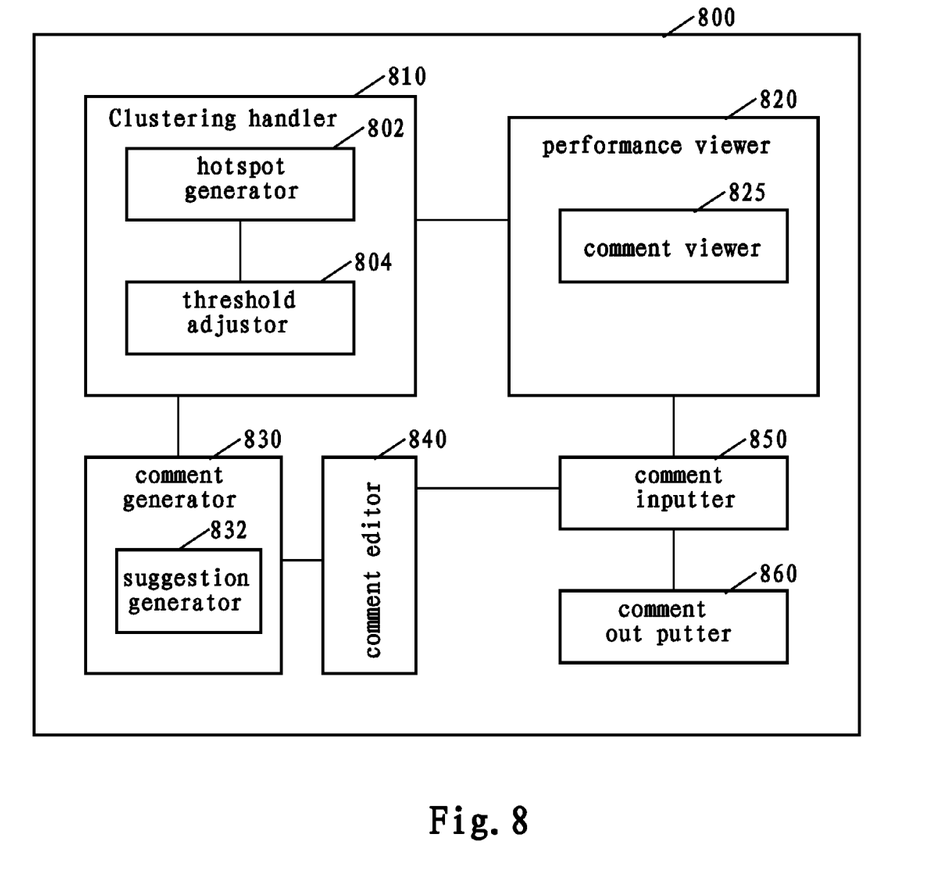
FIG. 8 is a schematic block diagram of the device for computer system performance analysis according to a third embodiment.

FIG. 8 is a schematic block diagram of a device 800 of computer system performance analysis according to a third embodiment.

As shown in FIG. 8, device 800 for computer system performance analysis according to this embodiment comprises a clustering handler 810 and a performance viewer 820.

Device 800 for computer system performance analysis may further comprise a performance log file receiver (not shown) for receiving a computer system performance log file. For example, a hardware performance counter (not shown) may monitor events (such as ticks, instruction cache miss (i-cache miss), data cache miss (d-cache miss)) during system operation, and a performance log file generator (not shown) may translate related signals into a computer system performance log file.

Clustering handler 810 can cluster the instructions involved in the computer system performance log files at flexible granularity to acquire code clusters. The clustering may be 2D clustering, such as, clustering on the dimensions of ticks and instruction address offset.

Performance viewer 820 is coupled to clustering handler 810 for outputting computer system performance analysis result based on the code clusters. For example, the computer system performance analysis result may be provided to users for viewing and using in a visual manner, such as in a list or graphic.

Clustering handler 810 comprises hotspot generator 802, which can recognize hotspots from the result of computer system performance according to a predetermined metric and generate a sorted list of the hotspots. For example, the predetermined metric can be tick percentage or tick density and the significant code cluster can be hotspots. Tick percentage is the rate of the ticks of a corresponding code cluster to sum of the ticks, and the ticks are the execution times of the corresponding code cluster counted by a counter. Tick density is the rate of the ticks and the address span of the corresponding code cluster. For example, those clusters with higher tick percentage can be recognized as significant code clusters, i.e. hotspots through sorting by tick percentage.

Hotspots mentioned above are only examples. Other significant code clusters such as large warm areas, code reordering potential areas can be recognized by clustering handler 810 as well.

Specifically, clustering handler 810 may implement the following processes: sorting the gaps in a descending order, the largest gap having a smallest number and the numbers of the other gap numbers increasing in order, wherein a gap is the difference between the address of a current instruction and the address of a next instruction; among all gaps, determining the significant gaps that are significantly larger than other gaps; identifying the corresponding instructions of the significant gaps to divide the codes into clusters. That is, instructions involved in the computer system performance log file are split into corresponding code clusters using instructions corresponding to the significant gaps as boundaries. Thus, the instructions are split into several clusters based on the determined significant gaps.

Herein, clustering handler 810 can determine the significant gaps according to the following manner. The slope of each gap is determined by:

$$S = \text{gap}_i / (N - i) \qquad (2)$$

Where, S is the slope, $\text{gap}_i$ is current gap value, i is the current gap number, and N is the total number of the gaps.

A first significant gap with significantly increased slope is determined. The gap with a slope the rate of which and the slope of the next gap is larger than a significant gap threshold is determined, and is identified as the first significant gap.

All other gaps larger than or equal to the first significant gap are identified as significant gaps.

Optionally, clustering handler 810 may further comprise threshold adjuster 804 for automatically adjusting and continually optimizing the significant gap threshold based on user usage in a manner of standard machine learning.

Further, clustering handler 810 may further comprise components (not shown) for implementing similar median filtering and binarization as that of the variation of the second embodiment, so as to conduct clustering process more effectively.

Optionally, device 800 for computer system performance analysis may further comprise comment generator 830 for attaching meaningful comments for the code clusters to those clusters. For example, the code clusters can be matched with the previous system performance analysis result to get corresponding code descriptions, which can be used as the comments of the corresponding code clusters. Alternatively, comment generator 830 can calculate distances between each code cluster and its adjacent clusters and attach the distances as the comments.

Optionally, device 800 for computer system performance analysis may further comprise comment editor 840 for enabling manual edition of the comments. For example, users can enter comment(s) about a certain instruction cluster(s) to specify its function, the procedure it belongs to, and the like.

Optionally, device 800 for computer system performance analysis may further comprise comment inputter 850 and comment outputter 860. Generated comments can be output as a comment file by comment outputter 860. When running other workloads by other users, the comments of corresponding instruction clusters can be entered through comment inputter 850 to achieve comment portability. As an illustrative example, centeroid (cluster center) can be used as a parameter of fuzzy matching, wherein centeroid can be calculated by:

$$\text{Centeroid} = \text{sum}(\text{ticks} * \text{offset}) / \text{sum}(\text{ticks}) \qquad (1)$$

Wherein, Centeroid is the center of a cluster, and ticks and offset represent tick and address offset respectively.

That is, Centeroid is the ratio of the sum of the products of the ticks and the address offset of a respective cluster, and the sum of the ticks. Since Centeroid is substantially constant for different workloads, the same Centeroid may indicate a matched address span with a corresponding cluster, and thus the same comment can be used in different workloads.

Optionally, comment generator 830 may further comprise suggestion supplier 832 for supplying performance optimizations based on, for example, hotspot statistics.

Optionally, performance viewer 820 may comprises comment viewer 825 for viewing comments. Alternatively, comment viewer 825 can be implemented as a component separated from the performance viewer.

Some examples of the invention described above will be discussed below.

EXAMPLE 1

Figure 10:
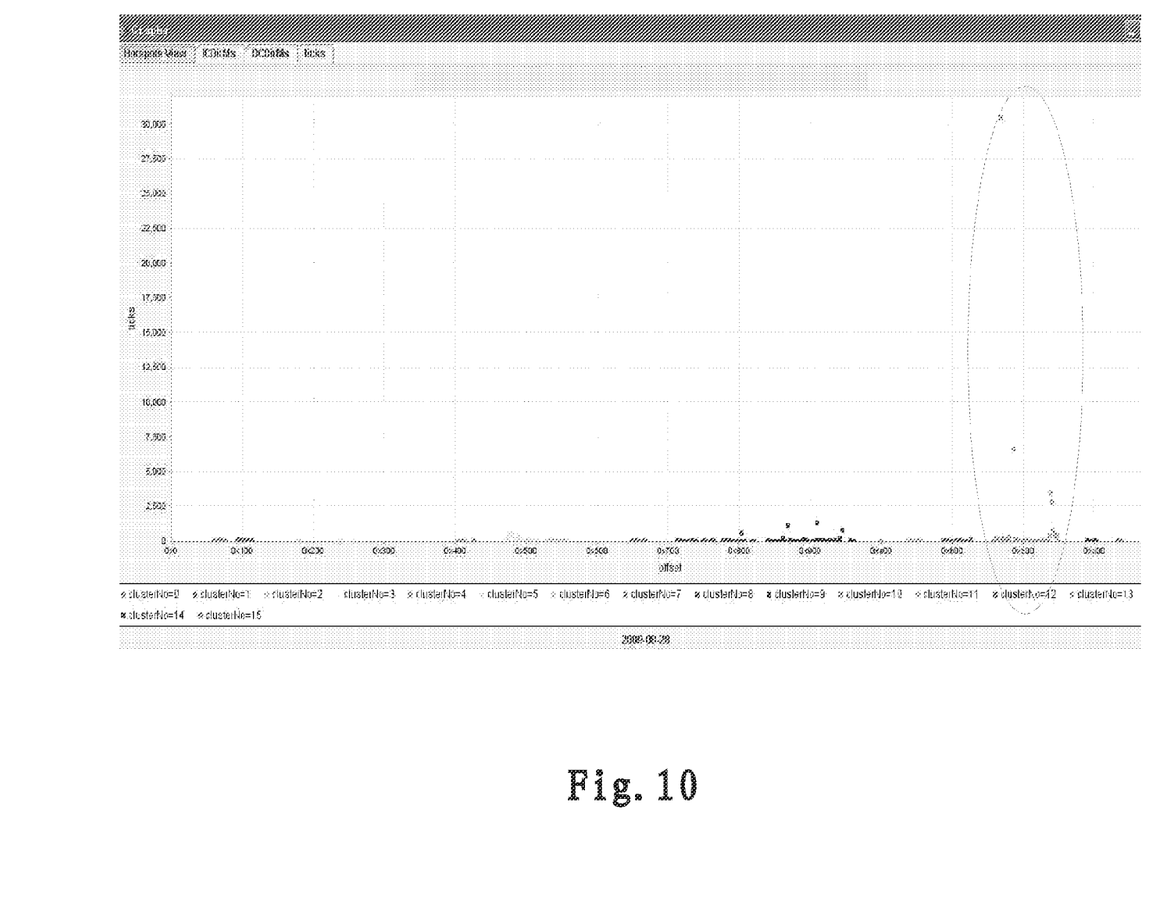

One application of the embodiment of this invention is to recognize hotspots to optimize system performance. FIGS. 9 and 10 are schematic views of the examples, in which hotspots are identified from performance analysis result according to the embodiments of this invention.

FIG. 9 shows a portion of the list of the example performance analysis result. As shown in FIG. 9, the tick density (tDensity) of the cluster with clusterNo=13 significantly higher than other clusters. Therefore, the cluster with clusterNo=13 is recognized as a hotspot. In the visual list shown in FIG. 10, the hotspot is highlighted by a ring.

EXAMPLE 2

Figure 11:
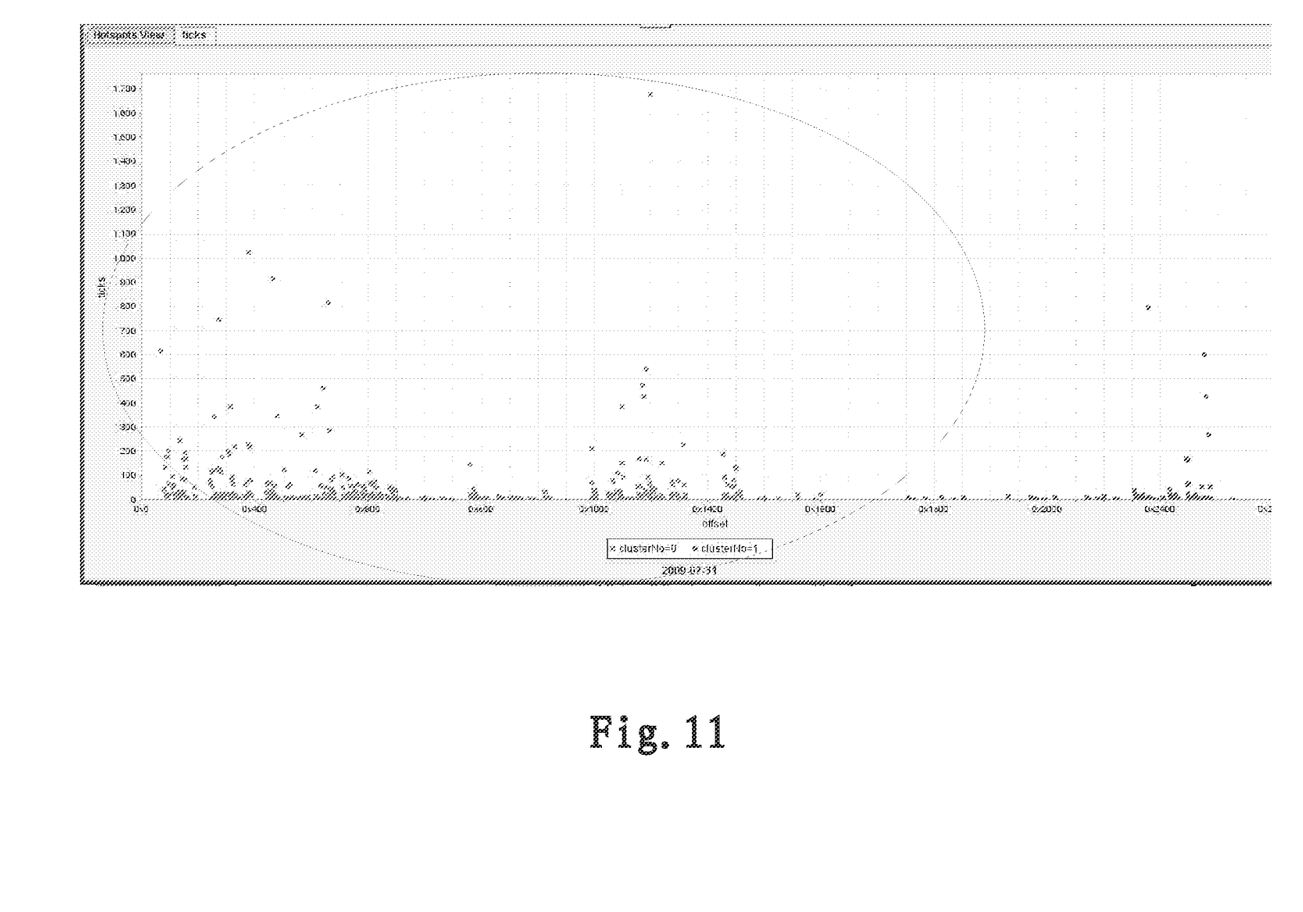
FIG. 11 is a schematic view of an example of identifying large warm areas from performance analysis results according to the embodiments.

FIG. 11 is a schematic view of the example of identifying large warm areas from performance analysis result according to the embodiments of this invention. Large warm areas are code areas having large instruction blocks that are intensively executed even though each instruction may only consume a few of cycles. Large warm areas have performance improvement potential as well.

As shown in FIG. 11, the clusters with clusterNo 0 and 1 are recognized as large warm areas and are highlighted with rings.

EXAMPLE 3

An embodiment of this invention can also recognize code reordering potential areas. For example, two or more clusters can be found within the system performance analysis result as code reordering potential areas, which pertain to one symbol and have smaller address spans and larger instruction cache miss density. Instruction cache miss density can be calculated as the rate of the count of instruction cache miss to the address span of a corresponding cluster.

In one example implementation, through reordering process, two code reordering potential areas are rearranged into adjacent areas, as a result, hotspots can be reduced, and 5% gain is achieved.

This invention can be implemented as a computer program product comprising all or part of codes for implementing the method and device for computer system performance analysis according to an embodiment. Those codes can be stored within the memories of other computer systems before use, for example, within hard disks or removable storages, such as optical disks or floppy disks, or can be downloaded through the Internet or other computer networks.

The disclosed method and device can be implemented in software, hardware or a combination thereof. The hardware portions can be implemented in specific logics; the software portions can be stored in a memory and can be executed by appropriate instruction execution systems, for example, microprocessors, PCs or a mainframe. Alternatively, the disclosed method and device can be remotely provided to users as services.

The embodiments of this invention have been described above. These specified embodiments describe the general features of this invention; others can easily modify and/or accommodate these specified embodiments by applying current knowledge without deviating from the general principle of the invention. Therefore, these applications and modifications should be considered falling within the meanings and equivalent scopes of the disclosed embodiments.

It should be understood that the wording and terms utilized herein are for the purpose of illustration but not limitation. Therefore, although this invention has been described by way of embodiments, those skilled in the art may appreciate that the invention can be implemented through modifications within the scope of the following appended claims.

What is claimed is:

1. A method for computer system performance analysis, comprising:
   receiving a computer system performance log;
   clustering instructions involved in the computer system performance log file at flexible granularity to identify code clusters, wherein the flexible granularity is a flexibly selected granularity value that is not fixed at any predefined level of instruction organization, wherein the flexible granularity is usable for clustering the instructions according to a status of execution of the computer system, wherein a first code cluster in the code clusters is clustered according to a first granularity value and a second code cluster in the code clusters is clustered according to a second granularity value;
   outputting a result of computer system performance analysis based on the code clusters;
   recognizing code clusters from the computer system performance log according to a predetermined metric;
   applying median filtering on values of ticks to remove noise;
   binarizing the values of the ticks using an average of the values of the ticks as a threshold; and
   further clustering a code cluster in the code clusters using the binarized values of the ticks.

2. The method according to claim 1, wherein the predetermined metric is a tick percentage and the significant code clusters are hotspots,
   wherein the tick percentage is a rate of ticks of a respective code cluster to a sum of the ticks, and the ticks are executing times of the respective code cluster counted by a counter.

3. The method according to claim 1, wherein the predetermined metric is a tick density and the significant code clusters are hotspots, and
   wherein the tick density is a rate of ticks and a range of addresses of a respective code cluster, and the ticks are executing times of the respective code cluster counted by a counter.

4. The method according to claim 1, further comprising:
   attaching comments about the code clusters to the respective code clusters.

5. The method according to claim 4, wherein the attaching comments about the code clusters to the respective clusters comprises:
   matching the code clusters with a system performance analysis result to get corresponding code descriptions; and
   associating comments with the code clusters using the code descriptions.

6. The method according to claim 4, wherein the attaching comments about the code clusters to the respective clusters comprises:
   calculating distances between each code cluster and its adjacent cluster; and associating comments with the code clusters using the distances.

7. A device for computer system performance analysis, comprising:
- a storage device including a storage medium, wherein the storage device stores computer usable program code; and
- a processor, wherein the processor executes the computer usable program code, and wherein the computer usable program code comprises computer usable program code for:
- a performance log file receiver for receiving a computer system performance log;
- a clustering handler for clustering instructions involved in the computer system performance log file at flexible granularity to acquire code clusters, wherein the flexible granularity is a flexibly selected granularity value that is not fixed at any predefined level of instruction organization, wherein the flexible granularity is usable for clustering the instructions according to a status of execution of the computer system, wherein a first code cluster in the code clusters is clustered according to a first granularity value and a second code cluster in the code clusters is clustered according to a second granularity value;
- a performance viewer for outputting the result of computer system performance analysis based on the code clusters;
- computer usable program code for a hotspot generator recognizing code clusters from the computer system performance log according to a predetermined metric;
- computer usable program code for applying median filtering on values of ticks to remove noise;
- computer usable program code for binarizing the values of the ticks using an average of the values of the ticks as a threshold; and
- computer usable program code for further clustering a code cluster in the code clusters using the binarized values of the ticks.

8. The device according to claim 7,
wherein the predetermined metric is a tick percentage, and wherein the tick percentage is a rate of ticks of a respective code cluster to a sum of the ticks, and the ticks are executing times of the respective code cluster counted by a counter.

9. The device according to claim 7,
wherein the predetermined metric is a tick density, and wherein the tick density is a rate of ticks and a range of addresses of a respective code cluster, and the ticks are executing times of the respective code cluster counted by a counter.

10. The device according to claim 7, wherein the computer usable program code for clustering handler further comprises computer usable program code for:
- a threshold adjustor for automatically adjusting a significant gap threshold value according to user usages.

11. The device according to claim 7, further comprising computer usable program code for:
- a comment generator for attaching comments indicating meanings of the code clusters to the respective clusters.

12. The device according to claim 11, wherein the comment generator matches the code clusters with a system performance analysis result to get corresponding code descriptions, and associates comments with the code clusters using the code descriptions.

13. The device according to claim 11, wherein the comment generator calculates distances between each code cluster and its adjacent cluster, and associates comments with the code clusters using the distances.

14. The device according to claim 11, wherein the comment generator comprises a suggestion supplier for supplying performance optimizations based on statistics about the hotspots.

15. The device according to claim 11, further comprising computer usable program code for:
- a comment inputter and a comment outputter for enabling portability of the comments using fuzzy matching, and
- the performance viewer comprising a comment viewer for viewing the comments.

* * * * *